United States Patent
Steeber et al.

(10) Patent No.: US 6,523,669 B1
(45) Date of Patent: Feb. 25, 2003

(54) ARTICLE GUIDE FOR AN APPARATUS FOR CONTROLLING THE FLOW OF ARTICLES

(75) Inventors: Dorian F. Steeber, Anderson, SC (US); Olivier P. Duterte, Greer, SC (US); Robert C. Beesley, Greenville, SC (US)

(73) Assignee: Hartness International, Inc., Greenville, SC (US)

( * ) Notice: Subject to any disclaimer, the term of this patent is extended or adjusted under 35 U.S.C. 154(b) by 59 days.

(21) Appl. No.: 09/650,183

(22) Filed: Aug. 29, 2000

(51) Int. Cl.⁷ .............................................. B65G 47/10
(52) U.S. Cl. ................. 198/370.01; 198/594; 198/602; 198/480.1
(58) Field of Search ................................. 198/594, 602, 198/597, 598, 480.1, 481.1, 370.01

(56) References Cited

U.S. PATENT DOCUMENTS

| | | | |
|---|---|---|---|
| 1,106,884 A | * | 8/1914 | Miller .................. 198/480.1 |
| 1,166,492 A | * | 1/1916 | Tevander ............... 198/480.1 |
| 1,761,223 A | * | 6/1930 | Meyer et al. ........... 198/480.1 |
| 1,985,897 A | * | 1/1935 | Huntar ................. 198/480.1 |
| 2,324,312 A | * | 7/1943 | Meyer et al. ........... 198/480.1 |
| 2,874,701 A | * | 2/1959 | Stelzer ................ 198/480.1 |
| 3,318,439 A | | 5/1967 | Sullivan |
| 4,018,325 A | | 4/1977 | Rejsa |
| 4,063,632 A | | 12/1977 | Neth et al. |
| 4,201,286 A | | 5/1980 | Meier |
| 4,413,724 A | | 11/1983 | Fellner |
| 4,469,219 A | | 9/1984 | Cossé |
| 4,513,858 A | | 4/1985 | Fellner |
| 4,718,656 A | | 1/1988 | Reist |
| 4,889,223 A | | 12/1989 | Bergstrom |
| 4,944,315 A | | 7/1990 | Focke |
| 4,989,718 A | | 2/1991 | Steeber |
| 5,067,857 A | | 11/1991 | Ward |
| 5,350,050 A | | 9/1994 | Franke |
| 5,413,213 A | | 5/1995 | Golz et al. |
| 5,417,317 A | | 5/1995 | Kalinich |
| 5,490,589 A | | 2/1996 | Golz et al. |
| 5,636,723 A | | 6/1997 | Bulle et al. |
| 5,690,463 A | | 11/1997 | Yoshie |
| 5,903,464 A | | 5/1999 | Stingel, Jr. et al. |
| 6,026,947 A | | 2/2000 | Persson |
| 6,152,291 A | * | 11/2000 | Steeber et al. .............. 198/594 |
| 6,182,812 B1 | * | 2/2001 | Hartness, III et al. ...... 198/364 |
| 6,230,874 B1 | * | 5/2001 | Steeber et al. .............. 198/602 |
| 6,260,688 B1 | * | 7/2001 | Steeber et al. ........... 198/347.4 |

FOREIGN PATENT DOCUMENTS

| | | |
|---|---|---|
| DE | 1262886 | 3/1968 |
| DE | 2307728 | 9/1974 |
| DE | 2618905 | 11/1977 |
| EP | 0259650 A3 | 3/1988 |
| EP | 0635414 A1 | 1/1995 |
| GB | 0831911 | 9/1957 |

OTHER PUBLICATIONS

WO 00/43294—Applicant requests the examiner to consider Figs. 1–17 of WO 00/43294 as prior art even though the publication date for the PCT Application would not make this document a reference.

* cited by examiner

*Primary Examiner*—Christopher P. Ellis
*Assistant Examiner*—Richard Ridley
(74) *Attorney, Agent, or Firm*—Dority & Manning

(57) ABSTRACT

An article transfer member including a resiliently mounted guide for aligning articles being transferred onto an outfeed conveyor from an infeed conveyor. The resiliently mounted guide includes an arcuate guide plate that is spring biased so as to flex responsive to variations in the dimensions of the packages being transferred normally as a result of a damaged package and maintaining the packages in alignment on the outfeed conveyor.

7 Claims, 7 Drawing Sheets

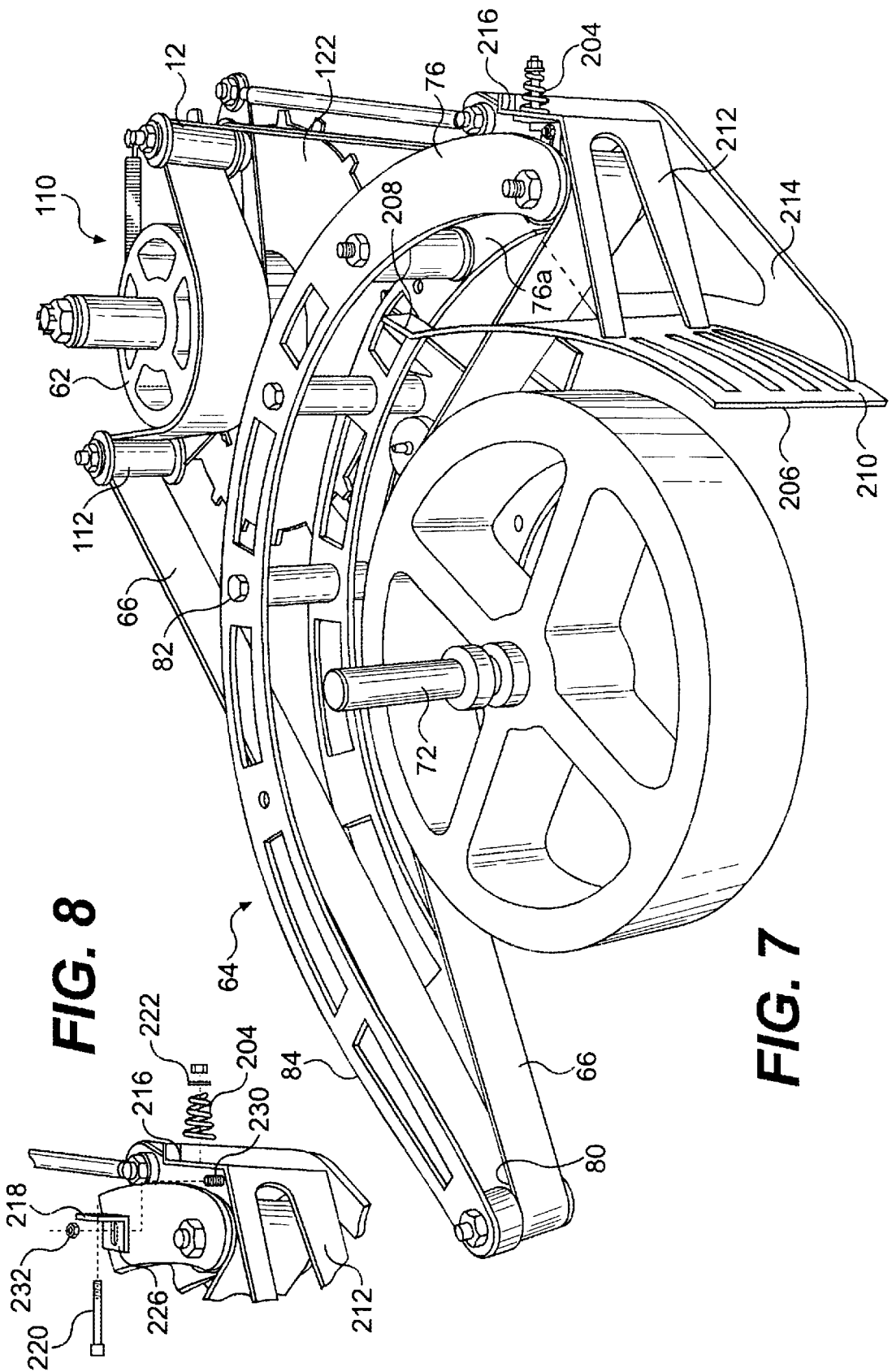

ARTICLE GUIDE FOR AN APPARATUS FOR CONTROLLING THE FLOW OF ARTICLES

BACKGROUND OF THE INVENTION

The present invention relates to a guide for controlling the transfer of articles between oppositely running conveyors.

There are many arrangements wherein oppositely running conveyors disposed side by side and generally parallel are used for transporting articles. A common such use is in conveying accumulator systems utilized between an upstream delivery station and a downstream receiving station to accumulate or store articles when the capacity of the downstream receiving station is either shut down or run at a speed wherein it cannot handle the number of articles being fed by the upstream delivery station. Such accumulator systems are well known to those skilled in the art. One particular accumulator is disclosed in U.S. Pat. No. 4,018,325. An additional prior art accumulator system is disclosed in U.S. Pat. No. 4,513,858. With such accumulator systems, and in any other system wherein articles are transferred from one conveyor running in one direction onto another conveyor running in an opposite direction, a device must be provided for controlling the transfer of the articles from one conveyor onto the other.

The present invention relates particularly to an article guide for a transport member or device utilized for controlling the transfer of articles from a first conveyor running in a first direction onto a second conveyor running in a second opposite direction.

OBJECTS AND SUMMARY OF THE INVENTION

It is therefore a principal object of the present invention to provide an improved article guide for an apparatus for controlling the flow of articles, particularly the flow of articles from a first conveyor driven in a first direction onto a second conveyor driven in a second direction.

An additional object of the invention is to provide a resilient article guide for maintaining articles of different dimensions in alignment as they are transferred between oppositely running conveyors.

Still another object of the invention is to provide a resilient article guide for use with an apparatus for transferring articles between oppositely running conveyors while minimizing binding of articles as they are being transferred.

Yet still another object of the present invention is to provide an improved article transport member for use on conventional conveyors.

Additional objects and advantages of the invention will be set forth in part in the following description, or may be obvious from the description, or may be learned through practice of the invention.

The present invention has particular application in conveyor accumulator systems wherein oppositely running and parallel conveyors are used to accumulate and store articles between an upstream receiving station and a downstream delivery station. One such accumulator system is disclosed and described in co-pending U.S. patent application Ser. No. 09/235,888 entitled "Apparatus for Controlling the Flow of Articles." The present invention is an improvement to co-pending U.S. patent application Ser. No. 09/456,957 entitled "Apparatus for Controlling the Flow of Articles".

Although conveyors are a feature of the present invention, conventional conveyors are well known to those skilled in the art and need not be described herein in great detail. The features of the conveyors necessary for an understanding of the invention will be sufficiently described.

In accordance with the objects and purposes of the invention, an apparatus is provided for controlling the flow of articles. This apparatus includes a first conveyor driven in a first direction to convey articles thereon in the first direction. A second conveyor is driven in a second opposite direction to convey articles thereon in the opposite direction. As mentioned above, the first and second conveyors may be used in a conventional accumulator system. The conveyors extend generally side by side and parallel with a constant space defined between the inside edges thereof.

A movable transport member is disposed generally across and movable along the space defined between the conveyors. The transport member has a drive member that is drivingly engaged simultaneously by the first and second conveyors so that the drive member continuously rotates as either of the first or second conveyors moves. The transport member will move linearly between the conveyors so long as a speed differential exists between the conveyors. In other words, if both conveyors are moving linearly in opposite directions but at the same speed, the transport member remains stationary relative to the conveyors but will rotate. If the conveyors are moving in opposite directions but at different speeds, the transfer member will rotate and also move linearly in the direction of the faster conveyor.

In a preferred embodiment, the drive member comprises a toothed wheel that is simultaneously engaged by drive lugs on each of the conveyors.

The transport member also includes an article transfer member. This article transfer member is operably disposed transversely relative to the conveyors to contact and transfer articles from the first conveyor to the second conveyor along a transfer path.

In one preferred embodiment of the invention, the article transfer member further includes an endless drive belt that is disposed along the transfer path so as to contact and move articles therealong. This drive belt may run in an endless path between the drive member and article transfer member. The drive belt is drivingly engaged by the drive member, for example by a belt drive wheel that is operably connected to or driven by the drive member.

In a preferred embodiment, the major components of the movable transport member are mounted or carried on pivotally mounted support members or plates. For example, the article transfer member is preferably mounted on a rear support plate and the drive member is mounted on a front support plate. These front and rear support plates are pivotal relative to each other at a common pivot point. The article transfer member may further include a dead plate that is disposed so as to extend between the conveyors along the transfer path. The articles moved between the conveyors are moved over this dead plate. The dead plate is carried by a support that is also pivotally mounted at the common pivot point but at a different height or level.

The supports or plates for the drive member, article transfer member, and dead plate are pivotally mounted relative to each other to provide for relative movement between the components as the transport member moves through curves defined by the conveyors. It is preferred to precisely control the relative movement between the components so that the flow of articles between the conveyors is not interrupted and is maintained at a relatively constant rate through the conveyor curves. In this manner, in a preferred embodiment, the front and rear support plates and dead plate support are engaged or connected by a gear mechanism so that pivotal movement of either of the front or rear support plates is transferred to the other of the respective front and rear support plates and to the dead plate support as the transport member moves along the conveyor curves. This gear mechanism preferably has a different gear ratio between the front and rear support plates as compared to the dead plate support. The gear ratio for the horseshoe guide support is selected to ensure that the horseshoe guide remains substantially perpendicular to the conveyors as the transport member moves along the conveyor curves.

It should be appreciated that any manner of gear mechanism may be utilized to properly gear the support plates together. In one preferred embodiment, the gear mechanism is mounted to the front support plate and comprises a first gear engaged with the rear support plate and a second gear engaged with the dead plate support. The different gears define the different gear ratios.

In one embodiment of the invention, the article transfer member includes an idler wheel. The transfer path for the articles is defined between the drive belt and a circumferential portion of the idler wheel. The articles may move along the idler wheel as they are transferred between the conveyors. The idle wheel may thus be formed of a relatively low friction producing material so as not to impede the operation of the drive belt that engages and moves the articles.

The article transfer member may also include a rigid guide member. This guide member generally defines the transfer path between the conveyors. The drive belt may be supported by and movable along this guide member. The guide member is carried by a support member that is engaged by at least one of the front, rear, and dead plate supports. The guide member support also includes oppositely extending guide arms that are movable in guide ways defined in the first and second conveyors. Thus, it should be understood that the guide member support will also pivot as the transport member moves through the conveyor curves.

In one preferred embodiment of the invention, a belt tensioning device is carried by the drive member. This belt tensioning device may have various configurations and, in one embodiment, includes belt guides around which the drive belt runs. These belt guides are pivotally mounted relative to each other and interconnected by a tension device, such as a spring or similar device. The belt tension is adjusted by adjusting the position of the spring relative to the belt guide. The belt tensioning device moves with the guide member so that belt tension is relatively constant at all times.

It is further preferred to include a rigid linkage member interconnected between at least one of the belt guides and the rigid guide member carried by the article transfer member. This rigid linkage member ensures that pivotal movement of the guide member is imparted to the belt guide as the transport member moves through the conveyor curves so that the pivotal movement of the guide member will cause the belt guides to change position accordingly to compensate for the change in position between the guide member and drive member. The guide member prevents advancing or retarding of the belt when entering or exiting curves. This causes the belt to move at a constant speed relative to the conveyor movement, which is necessary to maintain constant spacing of the packages being accumulated on the conveyor. In this manner, a relatively constant article conveying speed for the drive belt is maintained through the conveyor curve.

The present invention pertains to a resilient article guide for maintaining articles of different dimensions in alignment as they are transferred between the oppositely running conveyors. Sometimes the dimensions of the articles vary due to damaged packaging, etc. even when only a single desired dimension article is being transported from one conveyor to another by the article transport member. In order to maintain these articles, such as juice boxes, in alignment as they are moved from the transport member onto the adjacent conveyor, a resiliently biased article guide is used with the transport member. It includes an arcuate plate that can be moved out readily from the transport member by enlarged packages without causing binding of the packages as they exit the transport member.

The invention will be described below in greater detail by reference to embodiments disclosed in the attached figures.

BRIEF DESCRIPTION OF THE DRAWINGS

FIG. 7 is a perspective view of a transport member equipped with a resilient guide constructed in accordance with the present invention; and FIG. 8 is a perspective view of a mounting bracket for the resilient guide.

DETAILED DESCRIPTION

Figure 1:
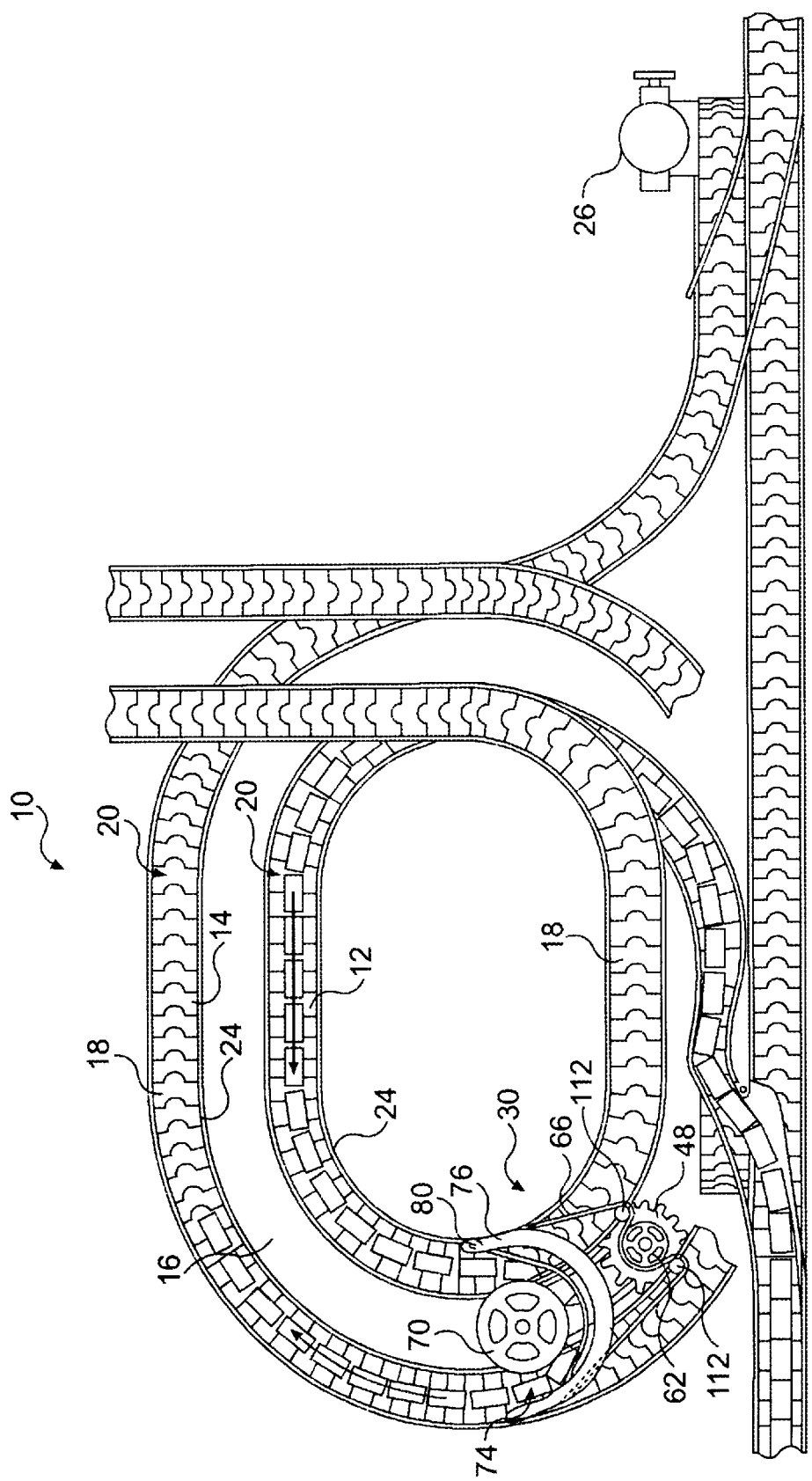
FIG. 1 is a perspective view of an accumulator system on which an improved article guide of FIG. 7 can be used incorporating the present invention.
Figure 2:
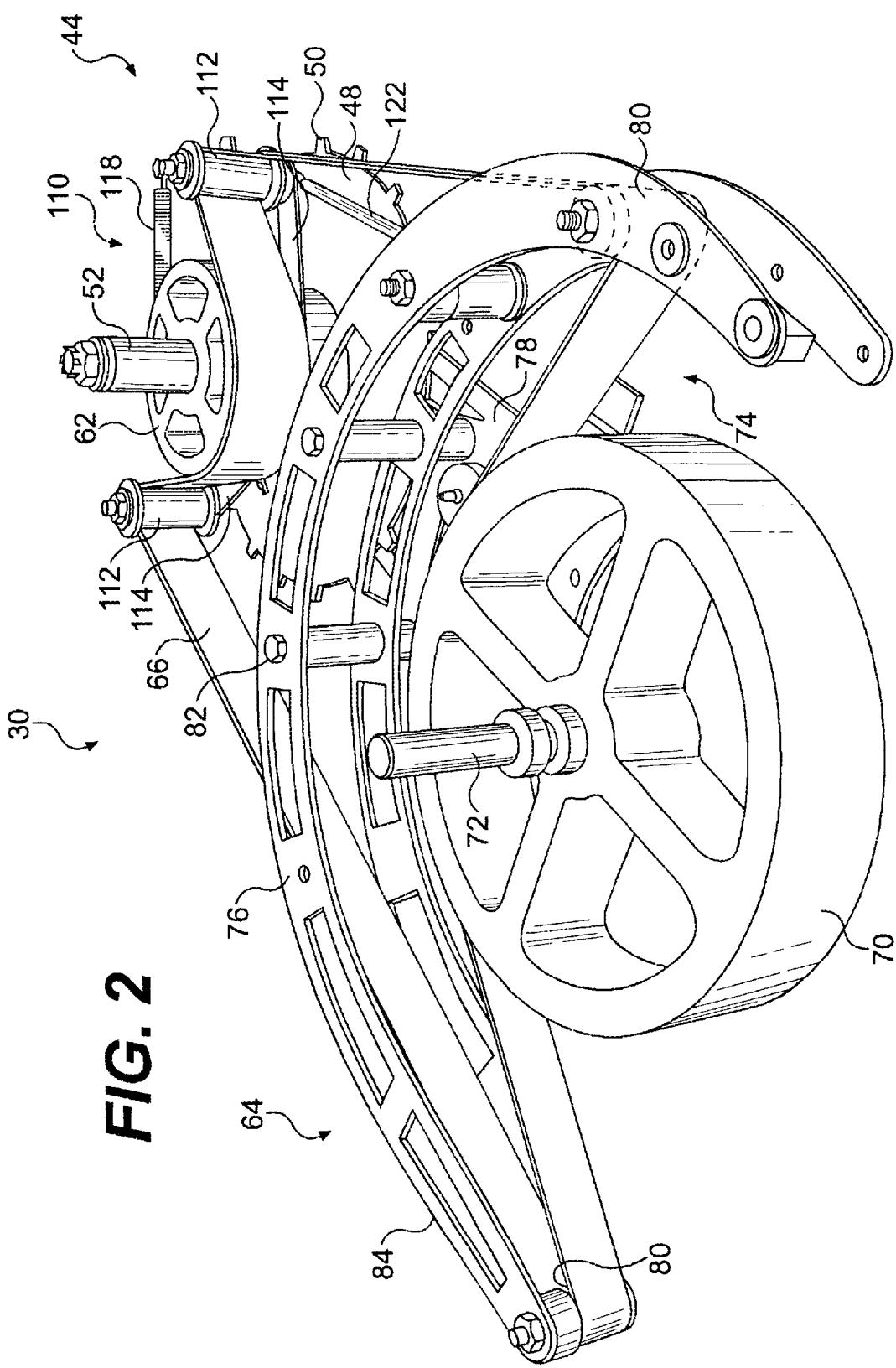
FIG. 2 is a perspective view of components of the transport member without the article guide of the present invention.

Reference will now be made in detail to the presently preferred embodiments of the invention, one or more examples of which are illustrated in the drawings. Each example is provided by way of explanation of the invention, not meant as a limitation of the invention. For example, the features illustrated or described as part of one embodiment may be utilized on another embodiment to yield still a further embodiment. It is intended that the present invention include such modifications and variations.

An apparatus, generally 10, according to the invention for controlling the flow of articles is illustrated generally in FIG. 1. Apparatus 10 includes a first conveyor 12 that moves in a first direction and a second conveyor 14 that moves in a second opposite direction. The first and second conveyors 12,14 are arranged in a side-by-side parallel relationship such that a constant space or gap 16 is defined between the inside edges of the conveyors. Conveyors 12, 14 may be formed as any conventional conveyor, including conventional link-type conveyors, belt conveyors, and the like.

The present invention is not limited to any particular conveying system and has application in any system wherein articles are to be moved from a first conveyor onto a second conveyor. As mentioned above, a conventional system incorporating such oppositely moving and parallel conveyors is an accumulator system, generally shown in FIG. 1, used for accumulating and storing articles between an upstream receiving station and a downstream delivery station. A detailed description of an accumulator system is provided in co-pending U.S. patent application Ser. No. 09/235,888 entitled "Apparatus for Controlling the Flow of Articles." The '888 application is incorporated herein in its entirety for all purposes.

Figure 3:
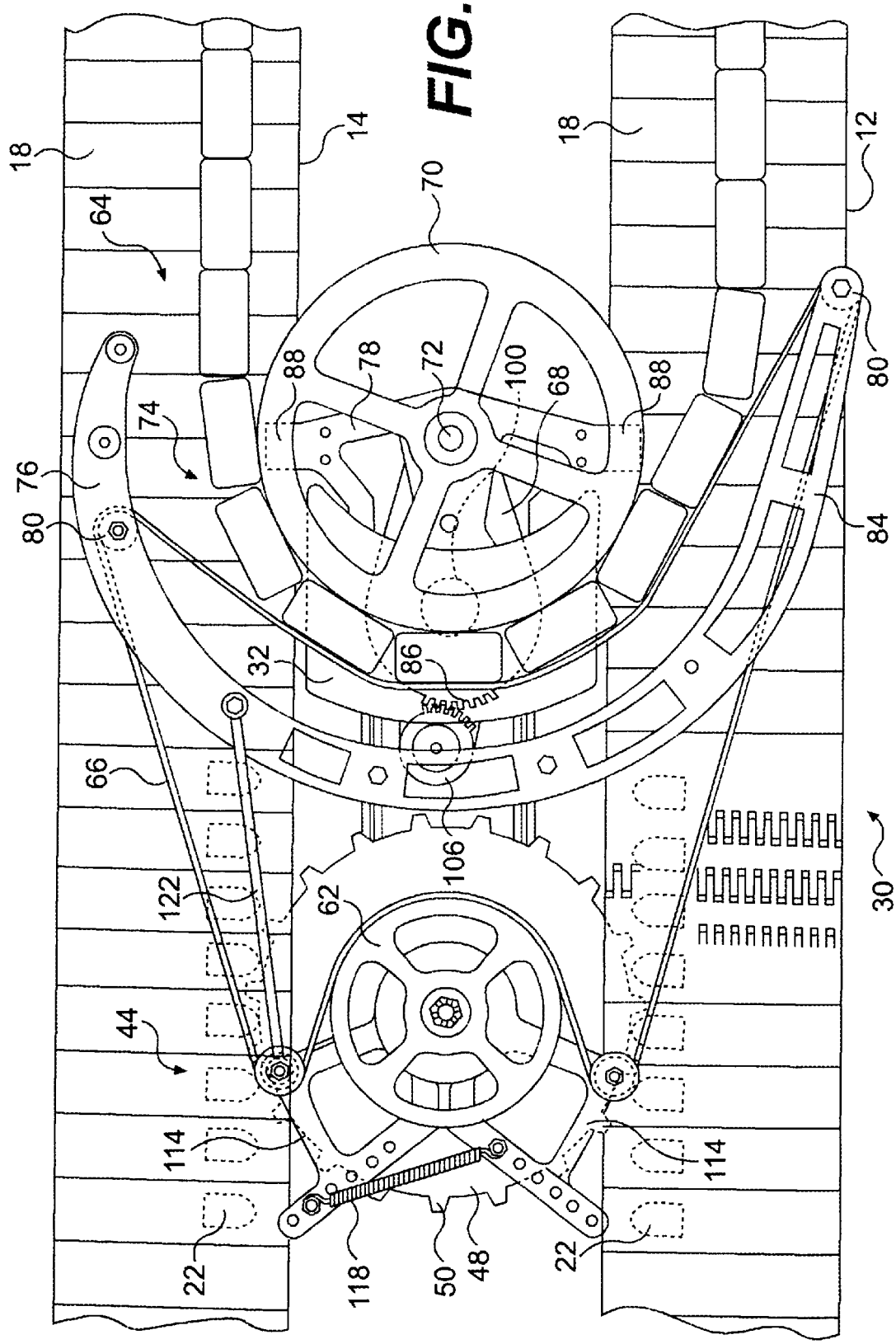
FIG. 3 is an operational view of the transport member of FIG. 2.

Conveyors 12, 14 may be formed of individual interconnected segments or links 18, as is well understood by those skilled in the art. Conveyors 12, 14 define an upper conveying surface, generally 20, upon which articles are placed to be conveyed by the conveyors. The underside of the conveyors 12, 14 is provided with spaced apart drive dogs (not illustrated). These drive dogs are conventionally engaged by a drive motor 26 (FIG. 1) or other mechanism for moving the conveyor in the conveying direction. This drive arrangement is well understood by those skilled in the art and need not be explained in great detail herein. Referring particularly to FIG. 3, the conveyors also include spaced apart drive lugs 22 also on the underside of the conveyors. These drive lugs 22 are engaged by a drive wheel of the drive member according to the invention, as discussed in greater detail below.

Conveyors 12, 14 are supported by any manner of frame structure generally illustrated as 24 in FIG. 1. Frame structure 24 preferably includes or defines longitudinally extending guide channel defined between the opposite facing edges that define space 16. These guide channels are engaged by arm members of a component of the article transfer member, as described in greater detail below. In an alternative embodiment not illustrated in the figures, such guide channels could also be defined in the oppositely facing edges of the conveyor links 18.

Figure 5:
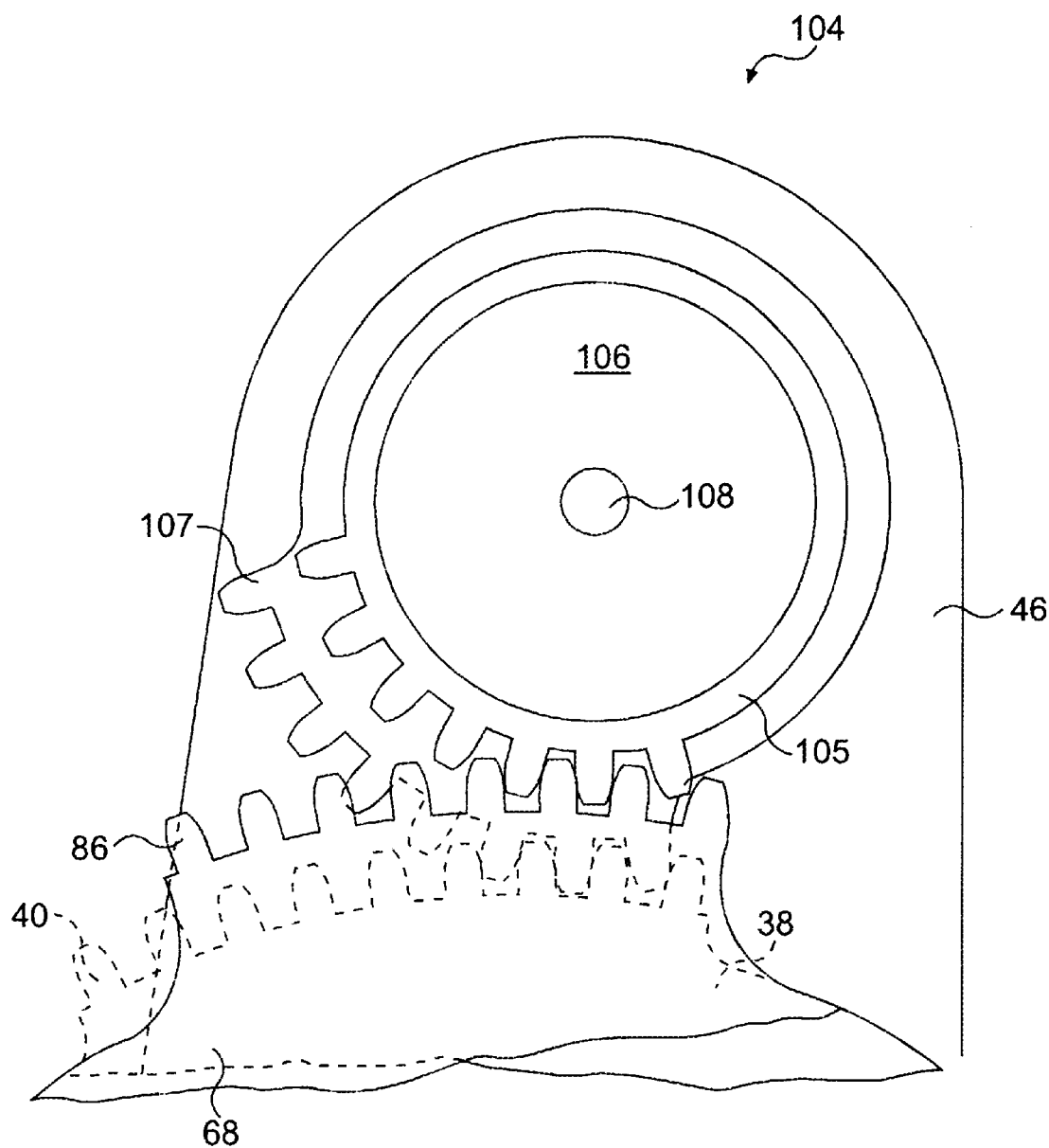
FIG. 5 is a detailed view of the gear mechanism according to the invention.
Figure 6:
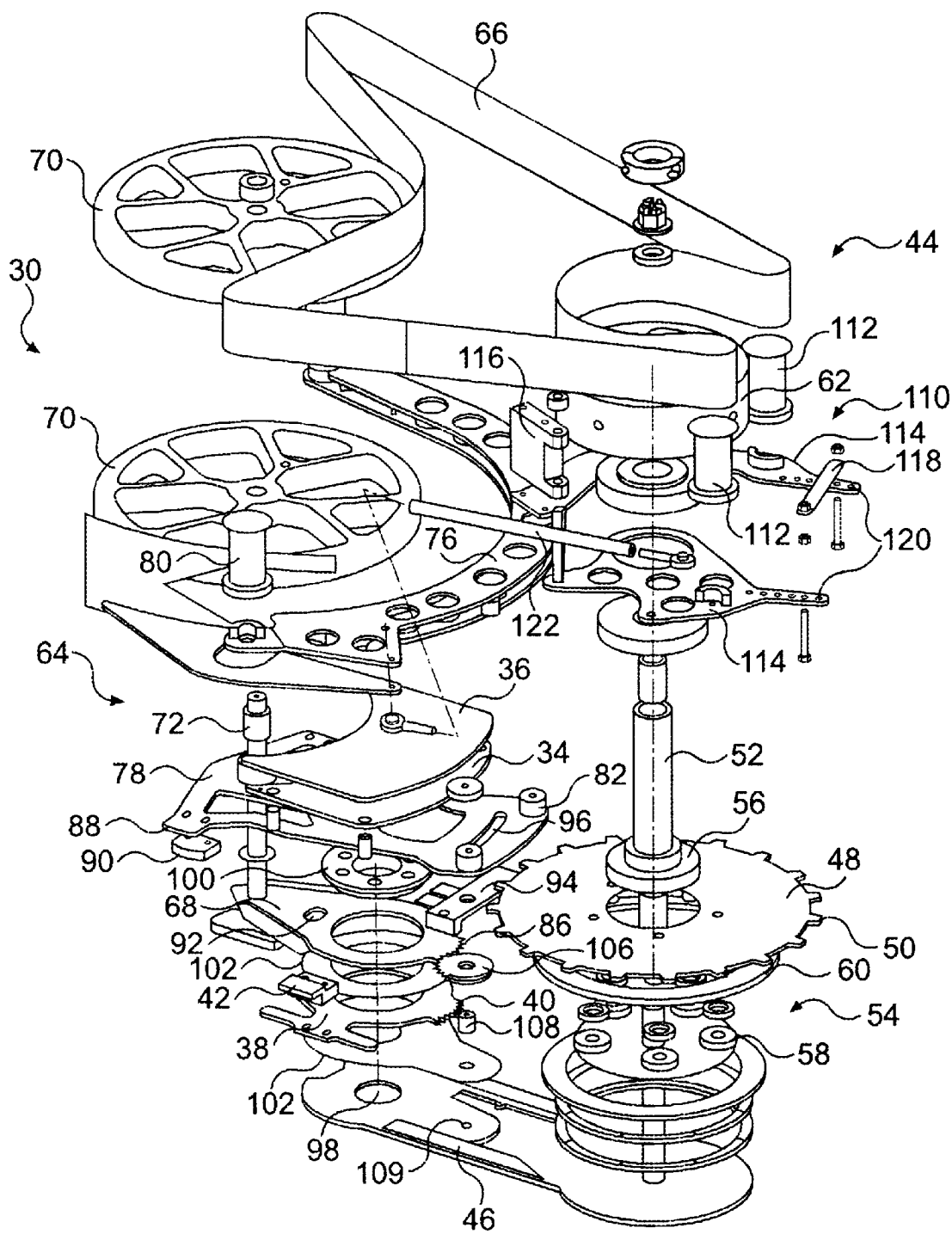
FIG. 6 is a detailed component view of an embodiment of the transport member according to the invention.

Apparatus 10 according to the invention also includes a movable transport member, generally 30. The following description relating to transport member 30 will be made in reference to FIGS. 2–6 in general, and particularly FIG. 6. It should be appreciated that FIG. 6 is a detailed component view of one preferred embodiment of transport member 30 and that certain components illustrated in FIG. 6 are not shown in the other figures for sake of clarity and explanation.

Transport member 30 is disposed so as to extend generally across space 16 between the conveyors, as generally illustrated in FIG. 1. Transport member 30 defines a transfer path for the articles, generally 74, from first conveyor 12 to second conveyor 14. In the preferred embodiment illustrated, transport member 30 includes a drive member, generally 44, and an article transfer member, generally 64.

Article transfer member 64 includes a member disposed transverse to the conveyor so as to contact and transfer articles from first conveyor 12 to second conveyor 14. In the embodiment illustrated, a drive belt 66 cooperating with an idler wheel or pair of wheels 70 is utilized in this regard. Drive path 74 is defined between drive belts 66 and a portion of the circumference of idler wheel 70. Articles conveyed on first conveyor 12 are frictionally engaged by drive belt 66 and moved across a dead plate 32 disposed across space 16. The articles are conveyed between idler wheel 70 and drive belt 66, as particularly illustrated in FIG. 1. Dead plate 32 will be described in greater detail below.

Drive belt 66 is an endless drive belt and runs in its path between drive member 44 and article transfer member 64. Drive belt 66 is driven by the drive member, for example by a drive wheel 48 driven by the drive member, as described in greater detail below.

Article transfer member 64 may include a rear support member, such as a plate member 68. Plate member 68 is pivotally mounted relative to a common pivot point 98. A bearing 100 is provided at pivot point 98 for this purpose. Rear support plate 68 carries axle 72 on which the idler wheel or pair of wheels 70 is mounted. Rear support plate 68 also includes gear teeth 86 defined on an opposite edge thereof, as particularly illustrated in FIGS. 5 and 6.

Transport member 30 also includes a drive member, generally 44. In the embodiment illustrated in the figures, drive member 44 includes a front support member or plate 46. Front support plate 46 is also pivotally mounted at common pivot point 98 by way of bearing 100 and a bearing layer 102. Front support plate 46 and rear support plate 68 are geared together by a gear mechanism, generally 104. Gear mechanism 104 may take on any manner of linkage or gearing arrangement and, in the illustrated embodiment, includes a gear member 106 that is mounted to front support plate 46 at location 109 by way of mounting device 108. Referring particularly to FIG. 5, gear member 106 is stationarily mounted and includes a first gear 105 and a second gear 107. Gears 105 and 107 have different diameters and thus comprise different gear ratios. Gear 107 engages with gear teeth 86 defined on rear support 68.

As mentioned above, a dead plate 32 is disposed across space 16 between the conveyors. The articles move onto and across dead plate 32 as they are transferred from one conveyor to the other. In the embodiment illustrated, dead plate 32 is comprised of a base member 34 having a friction reducing layer of material 36 attached thereto. Dead plate 32 is mounted to a dead plate support, such as plate member 38, that is also pivotally mounted to common pivot point 98 by way of bearing 100. An additional bearing layer 102 is disposed between dead plate support 38 and front support plate 46, as particularly illustrated in FIG. 6. Dead plate support 38 includes mounts 42 for mounting dead plate 32 thereon. As seen particularly in FIGS. 5 and 6, dead plate support 38 also includes gear teeth 40 defined on an edge thereof. Gear teeth 40 are engaged by second gear 107 of gear member 106. In this manner, pivotal movement of either of the front and rear support plates is transferred to the dead plate support as transport member 30 moves along curves defined by conveyors 12, 14. The size, and thus gear ratio, of gear 107 and 105 of gear member 106 are selected so that pivotal movement of front support plate 46 and rear support plate 68 is imparted or transferred to dead plate support 38 at a stepped down ratio so that dead plate 32 is maintained essentially perpendicular between conveyors 12, 14 as transport member 30 moves through the curve. This is an important consideration since the relative length of transfer path 74 between the conveyors should be maintained constant regardless of the position of transport member 30 relative to a straight or curved section of the conveyors. This is necessary so as to maintain a relatively constant article conveying rate as transport member 30 moves along the conveyors.

Figure 4:
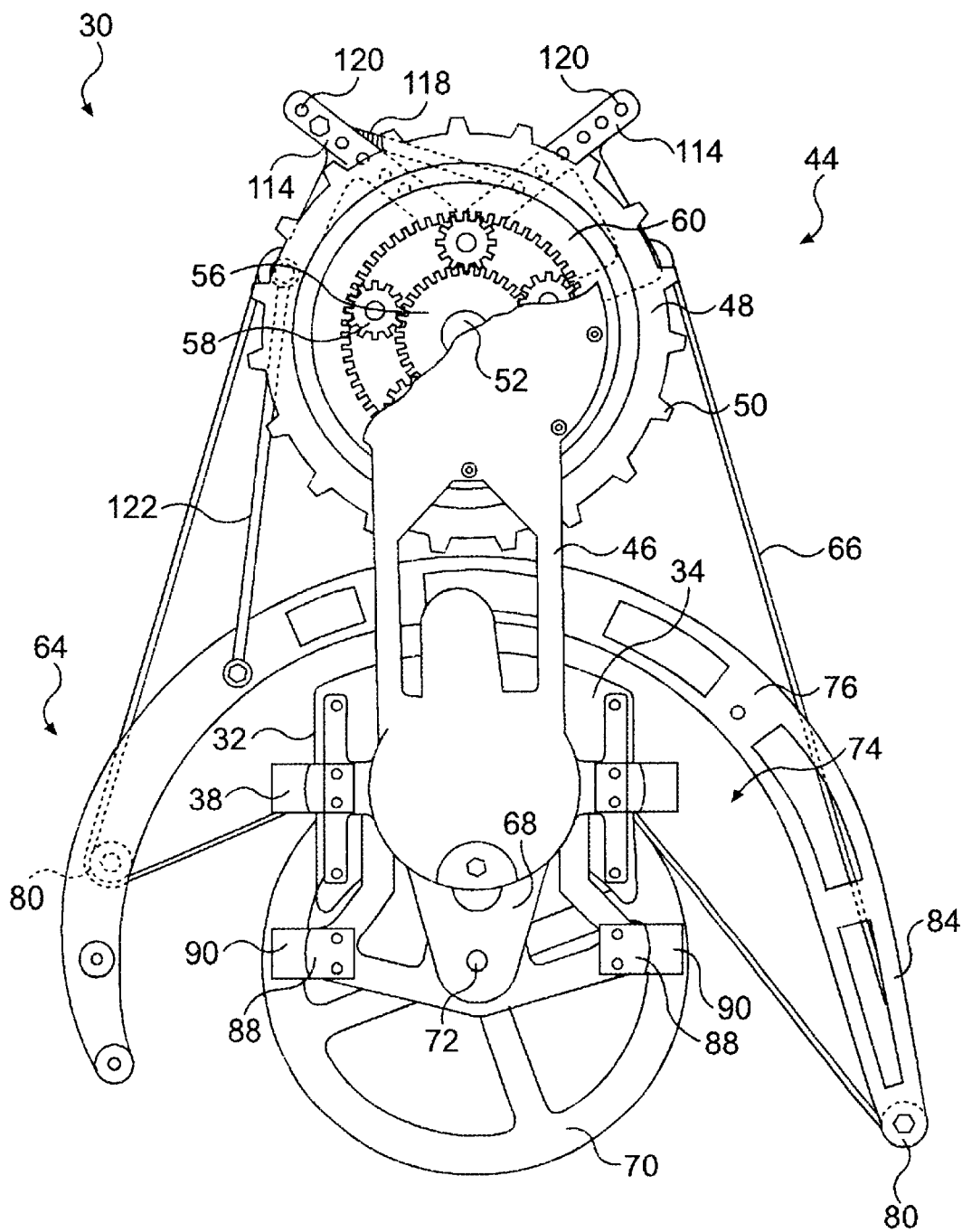
FIG. 4 is a partial cut-away underside view of an embodiment of the transport member.

Referring particularly to FIGS. 4 and 6, front support plate 46 includes an axle 52 mounted thereon. A drive wheel 48 is mounted on axle 52 and includes a plurality of teeth 50 defined on the circumference thereof. Teeth 50 engage with drive lugs 22 defined on the underside of conveyors 12, 14, as particularly illustrated in FIG. 3. Thus, it should be understood that so long as either of conveyors 12 or 14 is moving, drive wheel 48 will be caused to rotate. If conveyors 12, 14 are moving at the same linear speed, drive wheel 48 will rotate but remain linearly stationary. If a speed differential exists between conveyors 12, 14 drive wheel 48 will also move linearly in the direction of the faster moving of the conveyors. Thus, if conveyors 12, 14 are moving at the same linear speed, articles will be transferred from conveyor 12 to conveyor 14 at the same relative linear position. However, if the speed of the conveyors changes due to a change in the upstream or downstream supply/delivery stations, then transport member 30 will also move between the conveyors as it continues to transfer articles from conveyor 12 to conveyor 14.

A belt drive wheel 62 is also mounted on axle 52. Belt drive wheel 62 is rotationally driven by drive wheel 48 through a gear arrangement, such as a planetary gear arrangement 54. Referring particularly to FIGS. 4 and 6, planetary gear arrangement 54 includes a ring gear 60 mounted to stationary plate 46. Planet gears 58 are disposed between ring gear 60 and sun gear 56 and rotate on shafts mounted to drive wheel 48. Drive belt 66 is disposed in tension around a portion of the circumference of belt drive wheel 62, and is thus driven in its endless path by belt drive wheel 62.

A belt tensioning device, generally 110, is also preferably provided on drive member 44. Belt tensioning device 110 is provided so as to variably adjust the tension of drive belt 66. In the embodiment illustrated, belt tensioning device 110 includes belt guides 112 around which belt 66 runs. Belt guides 112 are mounted on supports 114 that are pivotally mounted relative to each other. In the embodiment illustrated in FIG. 6, a pivotal mounting block 116 is provided for this purpose. Supports 114 may also be pivotally mounted on axle 52, as generally illustrated in FIG. 3. Any number of devices or mechanisms may be utilized for pivotally interconnecting supports 114. A tensioning device, such as a spring 118, is interconnected between supports 114. Referring particularly to FIGS. 3 and 6, spring 118 is mounted between supports 114 by way of positioning holes 120. Thus, the tension of the device can be adjusted by changing mounting holes 120 to increase or decrease the tension on belt 66.

In the preferred embodiment illustrated in the figures, article transfer member 64 also includes a relatively rigid guide member 76. Guide member 76 may have a generally horseshoe-shape as illustrated in the figures, and generally defines the curved transfer path 74. Drive belt 66 runs along and is supported by guide member 76 by, for example, rollers 80. Guide member 76 has a longer side arm 84, as generally illustrated in FIGS. 3 and 4 that defines the receiving or entry point of articles through transfer path 74 and, thus, extends drive belt 66 well into the conveying path of the articles, as particularly seen in FIGS. 1 and 3.

Guide member 76 is supported by a guide member support, such as plate 78 particularly illustrated in FIG. 6. Guide member 76 is mounted to support plate 78 by any conventional means, including bolt mounts 82. Support plate 78 is pivotally mounted on axle 72 and includes oppositely extending arms 88 having bearing members 90 mounted thereon. Arms 88 and bearing members 90 ride in guide channels or grooves defined in support structure 24 of the conveyors, as mentioned above. The channels (not illustrated) in the support structure may comprise relatively simple C-shaped or V-shaped channels in which arms 88 with bearings 90 are disposed. The opposite end of guide member support plate 78 has a slot 96 defined therein. A pin (not illustrated) extending from a bearing block 94 extends through slot 96 and limits the pivotal movement of guide member support plate 78. Bearing block 94 is mounted to front support member or plate 46. Guide member support 78 is also engaged with at least one of the front support member 46, rear support member 68, or dead plate support 38. In the embodiment illustrated particularly in FIG. 6, a hole 102 is provided in front support member 68. A pin (not illustrated) extending upwardly from dead plate support 38 extends through hole 102 and into a receiving hole (not visible) in guide member support 78. Thus, pivotal movement of article transfer member 64 caused by arms 88 engaging in curved sections of conveyors 12, 14 is transferred to rear support member 68 and dead plate support 38.

A relatively rigid linkage member 122 may also be provided to interconnect guide member 76 and belt tensioning device 110. For example, linkage 122 may be mounted directly to guide member 76 or guide member support 78 at one end and directly to one of the supports 114 for belt guides 112 at the other end. Linkage member 122 is provided so that relative movement between guide member 76 and drive member 44 is imparted directly to tensioning device 110 to cause a change in belt position as transport member 30 moves through a curve in the conveyors. This change in belt position compensates for what would otherwise be a change in the effective running length of drive belt 66 caused by the pivotal movement between drive member 44 and article transfer member 64 which would result in a detrimental change in the conveying rate of the articles.

As shown in FIGS. 7 and 8, there is provided a resilient guide generally designated by the reference character 200 that is provided to receive the articles being transferred from the infeed conveyor to the outfeed conveyor by the transfer member 64 and maintain them in alignment. Sometimes the articles being transferred will vary in dimensions as a result of the packages being mishandled or damaged and will tend to turn sideways as they are released from between the idler wheel 70 and belt onto the outfeed conveyor 14. In order to ensure that the articles, regardless of variations in their dimensions, are in alignment and properly oriented as they exit from between the idler wheel 70 and the belt 66, a spring biased guide plate 202 is positioned to receive the articles from the belt 66 and direct them onto the outfeed conveyor 14. If an article is oriented improperly, the pressure from a spring 204 pushing against an arcuate guide plate 206 into engagement with the article properly realigns the article. The guide plate 206 has an inwardly extending flange 208 that projects over the upper surface of the belt 66. The other end of the guide plate 210 terminates downstream of the rigid members 76 and 76a forming the rigid guide member.

The arcuate shaped guide plate 206 is supported by outwardly extending arms 212 and a base member 214. The outwardly extending arms 212 terminate in a vertically extending wall 216. The wall 216 is secured to an L-shaped adjustable flange 218 by means of a bolt 220 which extends through a hole provided in the flange 218 and a hole provided in the plate 216. A spring 221 is placed on the bolt 220 and is secured thereto by means of a washer 222 and a nut 224. The biasing force applied by the spring can be adjusted by rotating the nut 224. The lower end 226 of the L-shaped flange 218 has an elongated slot 228 provided therein. A bolt 230 extends through a hole provided in the rigid member 76a and is secured thereto by means of a nut 232. As a result of the elongated slot 226 being provided in the horizontal flange of the bracket 218, the position of the arcuate plate 206 can be varied for accommodating different size articles being transferred by the article transfer member. In other words, the distance between the arcuate plate 206 and the idler wheel 70 can be varied by loosening the bolt 230 securing the bracket 218 and readjusting its position.

Accordingly, if an article that is being transferred by the transfer member tends to be rotated as it leaves the idler wheel 70 and belt 66, the arcuate surface of the resilient guide member 206 will realign the article so that as the articles are moved onto the outfeed conveyor 14 they are aligned properly with each other regardless of whether the dimensions of the articles vary. If one article has a larger width than the other, it will force the guide plate back slightly.

It should be appreciated by those skilled in the art that various modifications and variations can be made in the present invention without departing from the scope and spirit of the invention. For example, the particular structural members described herein can take on any manner of shape or configuration. In addition, the relative pivotal movements between the components can be supported by any manner of structure and gearing arrangement. It is intended that the present invention include such modifications and variations as come within the scope of the appended claims and their equivalents.

What is claimed:

1. An apparatus for controlling the flow of articles, comprising:

a first conveyor driven in a first direction to convey articles thereon in said first direction, and a second conveyor driven in a second direction opposite to said first direction to convey articles thereon in said second direction;

said first and second conveyors extending side-by-side and parallel with a space defined therebetween;

a movable transport member disposed generally across and movable along said space, said transport member having a drive member drivingly engaged simultaneously by said first and second conveyors so that said drive member continuously rotates as either of said first and second conveyors move and said transport member travels along said space if a relative speed difference exists between said first and second conveyors;

an article transfer member carried by said transport member and operably disposed relative to said conveyors to contact and transfer articles from said first conveyor to said second conveyor along a transfer path;

said article transfer member including an endless drive belt disposed along said transfer path so as to contact and move articles therealong, said drive belt driven by said drive member and running in an endless path between said drive member and said article transfer member;

an idler wheel, said transfer path defined between said drive belt and a circumferential portion of said idler wheel and having an inlet end and an outlet end; and a resiliently mounted guide carried by said transport member adjacent said outlet end of said transfer path for engaging said articles and guiding said articles onto said second conveyor as said articles leave said outlet end of said transfer path.

2. The apparatus as set forth in claim 1 wherein said resiliently mounted guide includes an arcuately shaped guide plate that engages said articles as said articles are released from between said idler wheel and said drive belt.

3. The apparatus as set forth in claim 1 wherein said resiliently mounted guide comprises a spring for biasing said arcuately shaped guide plate towards said idler wheel.

4. The apparatus as set forth in claim 1 further comprising an adjustable mounting member supporting said resiliently mounted guide for adjusting the distance between said resiliently mounted guide and said idler wheel for transferring articles of different dimensions.

5. The apparatus as set forth in claim 2 wherein said arcuately shaped guide plate has an inner end and an outer end, said inner end of said guide plate extending adjacent said endless drive belt for guiding said articles onto said second conveyor as said articles exit from between said drive belt and said idler wheel.

6. The apparatus as set forth in claim 2 wherein said guide plate has a curvature in the same direction as said circumferential portion of said idler wheel.

7. The apparatus as set forth in claim 1, wherein said drive member comprises a belt drive wheel, said drive belt disposed around and driven by said belt drive wheel.

* * * * *